(12) United States Patent
Juan et al.

(10) Patent No.: US 11,618,217 B2
(45) Date of Patent: *Apr. 4, 2023

(54) GENERATING THREE-DIMENSIONAL OBJECTS

(71) Applicant: Hewlett-Packard Development Company, L.P., Houston, TX (US)

(72) Inventors: Fernando Juan, Sant Cugat del Valles (ES); Alejandro Manuel De Pena, Sant Cugat del Valles (ES); Esteve Comas, Sant Cugat del Valles (ES); Edward Dale Davis, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/105,378

(22) Filed: Nov. 25, 2020

(65) Prior Publication Data

US 2021/0078250 A1 Mar. 18, 2021

Related U.S. Application Data

(63) Continuation of application No. 15/112,141, filed as application No. PCT/US2014/032333 on Mar. 31, 2014, now Pat. No. 10,889,059.

(30) Foreign Application Priority Data

Jan. 16, 2014 (WO) ................ PCT/EP2014/050841
Jan. 31, 2014 (WO) ................ PCT/US2014/014025

(51) Int. Cl.
*B29C 64/25* (2017.01)
*B33Y 40/00* (2020.01)
(Continued)

(52) U.S. Cl.
CPC .............. *B29C 64/25* (2017.08); *B33Y 40/00* (2014.12); *B29C 64/165* (2017.08);
(Continued)

(58) Field of Classification Search
CPC ..... B29C 64/25; B29C 64/165; B29C 64/176; B33Y 30/00; B33Y 40/00; B33Y 50/02
See application file for complete search history.

(56) References Cited

U.S. PATENT DOCUMENTS 4,120,630 A 10/1978 LaSpisa et al.
4,430,012 A 2/1984 Kooy et al.
(Continued)

FOREIGN PATENT DOCUMENTS

CN 1065239 A 10/1992
CN 1204277 A 1/1999
(Continued)

OTHER PUBLICATIONS

"Additive Manufacturing, An Idea per Day, A blog on 3D Printing, 3D Scanning and other loosely related topics," retrieved at https://exploreideasdaily.wordpress.com/tag/additive-manufacturing/, Sep. 7, 2016, 13 pages.
(Continued)

*Primary Examiner* — Joseph S Del Sole
*Assistant Examiner* — Mohamed K Ahmed Ali
(74) *Attorney, Agent, or Firm* — Shook, Hardy & Bacon L.L.P.

(57) ABSTRACT

According to examples, a build module may include a housing, a build material chamber, and a build chamber. The build material chamber may be positioned beneath the build chamber in the housing and may include a moveable support member, in which a build material distributor is to supply successive layers of build material onto the moveable support member from the build material chamber. The build
(Continued)

module may be removably insertable into a build receiver of an additive manufacturing system to allow the additive manufacturing system to solidify a portion of the successive layers received onto the moveable support member during the solidification process of the build material. The moveable support member may separate the build material chamber from the build chamber to block build material from the above the build material chamber from being received into the build material chamber during a solidification process of the build material.

15 Claims, 5 Drawing Sheets

(51) Int. Cl.
  *B33Y 30/00*   (2015.01)
  *B33Y 50/02*   (2015.01)
  *B29C 64/165*   (2017.01)
  *B29K 105/00*   (2006.01)

(52) U.S. Cl.
  CPC ......... *B29K 2105/251* (2013.01); *B33Y 30/00* (2014.12); *B33Y 50/02* (2014.12)

(56) References Cited

U.S. PATENT DOCUMENTS

| | | |
|---|---|---|
| 4,579,461 A | 4/1986 | Rudolph |
| 4,835,737 A | 5/1989 | Herrig et al. |
| 4,956,538 A | 9/1990 | Moslehi |
| 5,111,236 A | 5/1992 | Lo |
| 5,156,461 A | 10/1992 | Moslehi et al. |
| 5,182,056 A | 1/1993 | Spence et al. |
| 5,204,055 A | 4/1993 | Sachs et al. |
| 5,252,264 A | 10/1993 | Forderhase et al. |
| 5,427,733 A | 6/1995 | Benda et al. |
| 5,460,451 A | 10/1995 | Wadman |
| 5,508,489 A | 4/1996 | Benda et al. |
| 5,690,430 A | 11/1997 | Rudolph |
| 5,696,690 A | 12/1997 | Richardson et al. |
| 5,764,521 A | 6/1998 | Batchelder et al. |
| 5,784,956 A | 7/1998 | Walz |
| 5,866,058 A | 2/1999 | Batchelder et al. |
| 6,000,773 A | 12/1999 | Murray et al. |
| 6,162,378 A | 12/2000 | Bedal et al. |
| 6,169,605 B1 | 1/2001 | Penn et al. |
| 6,280,785 B1 | 8/2001 | Yang |
| 6,316,948 B1 | 11/2001 | Briefer |
| 6,363,606 B1 | 4/2002 | Johnson et al. |
| 6,366,825 B1 | 4/2002 | Smalley et al. |
| 6,376,148 B1 | 4/2002 | Liu et al. |
| 6,438,639 B1 | 8/2002 | Bakke et al. |
| 6,589,471 B1 | 7/2003 | Khoshnevis |
| 6,600,129 B2 | 7/2003 | Shen et al. |
| 6,658,314 B1 | 12/2003 | Gothait |
| 6,663,712 B2 | 12/2003 | Doyle et al. |
| 6,666,540 B2 | 12/2003 | Asauchi |
| 6,780,368 B2 | 8/2004 | Liu et al. |
| 6,799,959 B1 | 10/2004 | Tochimoto et al. |
| 6,802,581 B2 | 10/2004 | Hasseler et al. |
| 6,815,636 B2 | 11/2004 | Chung et al. |
| 6,838,035 B1 | 1/2005 | Ederer et al. |
| 6,896,839 B2 | 5/2005 | Kubo et al. |
| 6,930,278 B1 | 8/2005 | Chung et al. |
| 6,948,901 B2 | 9/2005 | Allemann |
| 7,037,382 B2 | 5/2006 | Davidson et al. |
| 7,407,256 B1 | 8/2008 | Han |
| 7,433,627 B2 | 10/2008 | German et al. |
| 7,515,986 B2 | 4/2009 | Huskamp |
| 7,537,722 B2 | 5/2009 | Andersson et al. |
| 7,658,976 B2 | 2/2010 | Kritchman |
| 7,680,555 B2 | 3/2010 | Dunn et al. |
| 7,722,151 B2 | 5/2010 | Elenes et al. |
| 7,829,000 B2 | 11/2010 | Farr et al. |
| 7,833,001 B2 | 11/2010 | Silverbrook |
| 7,879,282 B2 | 2/2011 | Hopkinson et al. |
| 7,958,841 B2 | 6/2011 | Kritchman et al. |
| 7,962,237 B2 | 6/2011 | Kritchman |
| 8,021,139 B2 | 9/2011 | Kumagai et al. |
| 8,047,251 B2 | 11/2011 | Khoshnevis |
| 8,070,473 B2 | 12/2011 | Kozlak |
| 8,137,739 B2 | 3/2012 | Philippi et al. |
| 8,770,714 B2 | 7/2014 | Krichtman et al. |
| 8,798,780 B2 | 8/2014 | Menchik et al. |
| 9,023,566 B2 | 5/2015 | Martin |
| 9,066,028 B1 | 6/2015 | Koshti |
| 9,421,715 B2 | 8/2016 | Hartmann et al. |
| 9,533,526 B1 | 1/2017 | Nevins |
| 9,643,359 B2 | 5/2017 | Baumann et al. |
| 10,220,564 B2 | 3/2019 | Nauka et al. |
| 10,625,468 B2 | 4/2020 | De Pena et al. |
| 2002/0020945 A1 | 2/2002 | Cho et al. |
| 2002/0079601 A1 | 6/2002 | Russell et al. |
| 2002/0086247 A1 | 7/2002 | Coe |
| 2002/0090410 A1 | 7/2002 | Tochimoto et al. |
| 2002/0105114 A1 | 8/2002 | Kubo et al. |
| 2002/0145213 A1 | 10/2002 | Liu et al. |
| 2003/0044593 A1 | 3/2003 | Vaidyanathan et al. |
| 2003/0074096 A1 | 4/2003 | Das et al. |
| 2003/0151167 A1 | 8/2003 | Kritchman et al. |
| 2003/0222066 A1 | 12/2003 | Low et al. |
| 2004/0026807 A1 | 2/2004 | Andersson et al. |
| 2004/0035542 A1 | 2/2004 | Ederer et al. |
| 2004/0084814 A1 | 5/2004 | Boyd et al. |
| 2004/0133298 A1 | 7/2004 | Toyserkani et al. |
| 2004/0137228 A1 | 7/2004 | Monsheimer et al. |
| 2004/0183796 A1 | 9/2004 | Velde et al. |
| 2004/0187714 A1 | 9/2004 | Napadensky et al. |
| 2004/0251581 A1 | 12/2004 | Jang et al. |
| 2005/0001356 A1 | 1/2005 | Tochimoto et al. |
| 2005/0025905 A1 | 2/2005 | Pan et al. |
| 2005/0049739 A1 | 3/2005 | Kramer et al. |
| 2005/0061241 A1 | 3/2005 | West et al. |
| 2005/0079086 A1 | 4/2005 | Farr et al. |
| 2005/0079132 A1 | 4/2005 | Wang et al. |
| 2005/0104241 A1 | 5/2005 | Kritchman et al. |
| 2005/0208168 A1 | 9/2005 | Hickerson et al. |
| 2005/0225007 A1 | 10/2005 | Lai et al. |
| 2005/0280185 A1 | 12/2005 | Russell et al. |
| 2006/0054039 A1 | 3/2006 | Kritchman et al. |
| 2006/0060100 A1 | 3/2006 | Thienard et al. |
| 2006/0061618 A1 | 3/2006 | Hernandez et al. |
| 2006/0085088 A1 | 4/2006 | Nakayama et al. |
| 2006/0091199 A1 | 5/2006 | Loughran |
| 2006/0091842 A1 | 5/2006 | Nishiyama |
| 2006/0111807 A1 | 5/2006 | Gothait et al. |
| 2006/0180957 A1 | 8/2006 | Hopkinson et al. |
| 2006/0192315 A1 | 8/2006 | Farr et al. |
| 2006/0219671 A1 | 10/2006 | Merot et al. |
| 2006/0244169 A1 | 11/2006 | Monsheimer et al. |
| 2006/0249884 A1 | 11/2006 | Partanen et al. |
| 2006/0290032 A1 | 12/2006 | Sano |
| 2007/0023977 A1 | 2/2007 | Braun |
| 2007/0063372 A1* | 3/2007 | Nielsen ................ B29C 64/165 425/375 |
| 2007/0075460 A1 | 4/2007 | Wahlstrom |
| 2007/0109340 A1 | 5/2007 | Nicodem |
| 2007/0158411 A1 | 7/2007 | Kreig, Jr. |
| 2007/0196561 A1 | 8/2007 | Philippi et al. |
| 2007/0228592 A1 | 10/2007 | LaBossiere et al. |
| 2007/0238056 A1 | 10/2007 | Baumann et al. |
| 2007/0241482 A1 | 10/2007 | Giller et al. |
| 2008/0131546 A1 | 6/2008 | Perret et al. |
| 2008/0241404 A1 | 10/2008 | Allaman et al. |
| 2008/0269939 A1 | 10/2008 | Kritchman |
| 2009/0020920 A1 | 1/2009 | Kumagai et al. |
| 2009/0152771 A1 | 6/2009 | Philippi et al. |
| 2009/0206065 A1 | 8/2009 | Kruth et al. |
| 2009/0229936 A1 | 9/2009 | Cuong |
| 2010/0043698 A1 | 2/2010 | Bolt |
| 2010/0121476 A1 | 5/2010 | Kritchman |
| 2010/0125356 A1 | 5/2010 | Shkolnik et al. |

(56) References Cited

U.S. PATENT DOCUMENTS

| | | |
|---|---|---|
| 2010/0155985 A1 | 6/2010 | McAlea |
| 2010/0167191 A1 | 7/2010 | Black et al. |
| 2010/0191360 A1 | 7/2010 | Napadensky et al. |
| 2010/0244333 A1 | 9/2010 | Bedal et al. |
| 2010/0256945 A1 | 10/2010 | Murata |
| 2010/0283188 A1 | 11/2010 | Rohner et al. |
| 2010/0323050 A1 | 12/2010 | Kumagai et al. |
| 2010/0323301 A1 | 12/2010 | Tang |
| 2010/0327479 A1 | 12/2010 | Zinniel et al. |
| 2011/0016334 A1 | 1/2011 | Tom et al. |
| 2011/0032301 A1 | 2/2011 | Fienup et al. |
| 2011/0069301 A1 | 3/2011 | Marzok et al. |
| 2011/0147993 A1 | 6/2011 | Eshed et al. |
| 2011/0241240 A1 | 10/2011 | Gothait et al. |
| 2011/0254365 A1 | 10/2011 | Volkmann |
| 2012/0100031 A1 | 4/2012 | Ljungblad |
| 2012/0105903 A1 | 5/2012 | Pettis |
| 2012/0139167 A1 | 6/2012 | Fruth et al. |
| 2012/0156516 A1 | 6/2012 | Matsui et al. |
| 2012/0201960 A1 | 8/2012 | Hartmann et al. |
| 2012/0231175 A1 | 9/2012 | Tan |
| 2012/0280415 A1 | 11/2012 | Halford |
| 2012/0287470 A1 | 11/2012 | Pettis |
| 2013/0053995 A1 | 2/2013 | Hashimoto et al. |
| 2013/0067016 A1 | 3/2013 | Adkins et al. |
| 2013/0073068 A1 | 3/2013 | Napadensky |
| 2013/0075013 A1 | 3/2013 | Chillscyzn et al. |
| 2013/0088554 A1 | 4/2013 | Veis |
| 2013/0098068 A1 | 4/2013 | Takahashi et al. |
| 2013/0186549 A1 | 7/2013 | Comb et al. |
| 2013/0220572 A1 | 8/2013 | Rocco et al. |
| 2013/0241095 A1 | 9/2013 | Korten et al. |
| 2013/0314465 A1 | 11/2013 | Lebron et al. |
| 2013/0328228 A1 | 12/2013 | Pettis et al. |
| 2013/0343947 A1 | 12/2013 | Satzger et al. |
| 2014/0025529 A1 | 1/2014 | Honeycutt et al. |
| 2014/0027952 A1 | 1/2014 | Fan et al. |
| 2014/0034214 A1 | 2/2014 | Boyer et al. |
| 2014/0039659 A1 | 2/2014 | Boyer et al. |
| 2014/0065194 A1 | 3/2014 | Yoo et al. |
| 2014/0074274 A1 | 3/2014 | Douglas et al. |
| 2014/0121820 A1 | 5/2014 | Das et al. |
| 2014/0141166 A1 | 5/2014 | Rodgers |
| 2014/0203479 A1 | 7/2014 | Teken et al. |
| 2014/0223583 A1 | 8/2014 | Wegner et al. |
| 2014/0236773 A1 | 8/2014 | Hamilton et al. |
| 2014/0255666 A1 | 9/2014 | Stucker et al. |
| 2014/0265047 A1 | 9/2014 | Burris et al. |
| 2014/0291480 A1 | 10/2014 | Bruder et al. |
| 2015/0024319 A1 | 1/2015 | Martin |
| 2015/0044383 A1 | 2/2015 | Kim et al. |
| 2015/0045928 A1 | 2/2015 | Perez et al. |
| 2015/0056319 A1 | 2/2015 | Din et al. |
| 2015/0057784 A1 | 2/2015 | Butler et al. |
| 2015/0061195 A1 | 3/2015 | Defelice et al. |
| 2015/0091208 A1 | 4/2015 | Sadusk et al. |
| 2015/0174658 A1 | 6/2015 | Ljungblad |
| 2015/0210010 A1 | 7/2015 | Napadensky |
| 2015/0266239 A1 | 9/2015 | Okamoto et al. |
| 2015/0269290 A1 | 9/2015 | Nelaturi et al. |
| 2015/0283610 A1 | 10/2015 | Ljungblad |
| 2015/0290710 A1 | 10/2015 | Ackelid |
| 2015/0328838 A1 | 11/2015 | Erb et al. |
| 2016/0034292 A1 | 2/2016 | Cao et al. |
| 2016/0096326 A1 | 4/2016 | Naware |
| 2016/0096327 A1 | 4/2016 | Fry et al. |
| 2016/0107229 A1 | 4/2016 | Okazaki et al. |
| 2016/0173865 A1 | 6/2016 | Donaldson |
| 2016/0185040 A1 | 6/2016 | Costlow |
| 2016/0271884 A1 | 9/2016 | Herzog |
| 2016/0325496 A1 | 11/2016 | De et al. |
| 2016/0332375 A1 | 11/2016 | Juan |
| 2016/0339642 A1 | 11/2016 | Donovan |
| 2017/0173865 A1 | 6/2017 | Dikovsky et al. |
| 2017/0220031 A1 | 8/2017 | Morovic, Jr |
| 2017/0297095 A1 | 10/2017 | Zalameda et al. |
| 2017/0304895 A1 | 10/2017 | Porch et al. |
| 2018/0017679 A1 | 1/2018 | Valouch et al. |
| 2018/0111314 A1 | 4/2018 | Philippi |
| 2018/0147786 A1 | 5/2018 | Hakkaku et al. |
| 2018/0200791 A1 | 7/2018 | Redding et al. |
| 2018/0222112 A1 | 8/2018 | Danzig et al. |
| 2019/0070786 A1 | 3/2019 | Lewis et al. |

FOREIGN PATENT DOCUMENTS

| | | |
|---|---|---|
| CN | 1426335 A | 6/2003 |
| CN | 1500608 A | 6/2004 |
| CN | 1789928 A | 6/2006 |
| CN | 1939706 | 4/2007 |
| CN | 1976799 A | 6/2007 |
| CN | 1976800 A | 6/2007 |
| CN | 101076550 A | 11/2007 |
| CN | 101326046 | 12/2008 |
| CN | 102186653 A | 9/2011 |
| CN | 102470439 A | 5/2012 |
| CN | 102695476 A | 9/2012 |
| CN | 102950770 A | 3/2013 |
| CN | 103136792 A | 6/2013 |
| CN | 103338880 A | 10/2013 |
| CN | 103338881 A | 10/2013 |
| CN | 103384591 A | 11/2013 |
| CN | 103429075 A | 12/2013 |
| CN | 103492159 A | 1/2014 |
| CN | 104210110 A | 12/2014 |
| DE | 4112695 A1 | 7/1992 |
| DE | 10311446 A1 | 4/2004 |
| DE | 102004017769 A1 | 12/2004 |
| DE | 102009036153 | 2/2011 |
| DE | 102009056696 A1 | 6/2011 |
| DE | 202010010771 U1 | 11/2011 |
| DE | 102011009624 A1 | 8/2012 |
| DE | 102011012412 A1 | 8/2012 |
| DE | 102012009071 A1 | 11/2013 |
| DE | 102013017792 A1 | 4/2015 |
| EP | 0338751 A2 | 10/1989 |
| EP | 1452298 | 9/2004 |
| EP | 1466718 A2 | 10/2004 |
| EP | 1563928 A2 | 8/2005 |
| EP | 1634694 A2 | 3/2006 |
| EP | 1648686 A1 | 4/2006 |
| EP | 1704989 A2 | 9/2006 |
| EP | 1707341 | 10/2006 |
| EP | 1737646 A1 | 1/2007 |
| EP | 1764208 | 3/2007 |
| EP | 1613480 B1 | 11/2007 |
| EP | 1872928 A1 | 1/2008 |
| EP | 2199068 A2 | 6/2010 |
| EP | 2463081 | 6/2012 |
| EP | 3036618 A1 | 6/2016 |
| GB | 2422344 A | 7/2006 |
| JP | 04-093228 A | 3/1992 |
| JP | 2001-334581 A | 12/2001 |
| JP | 2002-292748 A | 10/2002 |
| JP | 2003-231182 A | 8/2003 |
| JP | 2004-114685 A | 4/2004 |
| JP | 2004-262243 A | 9/2004 |
| JP | 2004-306612 A | 11/2004 |
| JP | 2005-007572 A | 1/2005 |
| JP | 2005-503939 A | 2/2005 |
| JP | 2005-132110 A | 5/2005 |
| JP | 2005-335199 | 12/2005 |
| JP | 2006-183146 A | 7/2006 |
| JP | 2006312310 | 11/2006 |
| JP | 2007-021747 A | 2/2007 |
| JP | 2007098947 | 4/2007 |
| JP | 2007-219628 A | 8/2007 |
| JP | 2007-529340 A | 10/2007 |
| JP | 2008302701 | 12/2008 |
| JP | 2009-040032 A | 2/2009 |
| JP | 2009508723 | 3/2009 |
| JP | 2009-220576 A | 10/2009 |
| JP | 2010-509090 A | 3/2010 |
| JP | 2010-090350 A | 4/2010 |

(56) References Cited

FOREIGN PATENT DOCUMENTS

| | | |
|---|---|---|
| JP | 2011-099023 A | 5/2011 |
| JP | 2012-030389 A | 2/2012 |
| JP | 2012-096426 A | 5/2012 |
| JP | 2012-101532 A | 5/2012 |
| JP | 2012-515668 A | 7/2012 |
| TW | I239888 | 9/2005 |
| TW | 201536534 A | 10/2015 |
| WO | 95/34468 A1 | 12/1995 |
| WO | 96/06881 A2 | 3/1996 |
| WO | 01/38061 A1 | 5/2001 |
| WO | 2004/011159 A1 | 2/2004 |
| WO | 2005/007390 A1 | 1/2005 |
| WO | 2005/011959 A1 | 2/2005 |
| WO | 2005/090055 A1 | 9/2005 |
| WO | WO-2006091842 | 8/2006 |
| WO | 2007/039450 A1 | 4/2007 |
| WO | 2007/147221 A1 | 12/2007 |
| WO | 2008/055533 A1 | 5/2008 |
| WO | WO-2008151063 | 12/2008 |
| WO | 2009/013751 A2 | 1/2009 |
| WO | 2011/065920 A1 | 6/2011 |
| WO | 2012/058278 A2 | 5/2012 |
| WO | 2012/061945 A1 | 5/2012 |
| WO | 2012/085914 A1 | 6/2012 |
| WO | 2012/088253 A1 | 6/2012 |
| WO | WO-2012078533 | 6/2012 |
| WO | WO-2013021173 | 2/2013 |
| WO | WO-2013030064 | 3/2013 |
| WO | 2013/086309 A1 | 6/2013 |
| WO | 2013/098054 A1 | 7/2013 |
| WO | 2013/113372 A1 | 8/2013 |
| WO | 2013/127655 A1 | 9/2013 |
| WO | 2013/140147 A1 | 9/2013 |
| WO | 2013/174526 A1 | 11/2013 |
| WO | 2014/039378 A1 | 3/2014 |
| WO | WO-2014068579 | 5/2014 |
| WO | 2015/022572 A2 | 2/2015 |
| WO | 2015/026749 A1 | 2/2015 |
| WO | WO-2015-027938 | 3/2015 |
| WO | WO-2015071183 A1 | 5/2015 |
| WO | 2015/108550 A1 | 7/2015 |

OTHER PUBLICATIONS

"Manual of HP Designjet L25500 Printer Series," retrieved at http://h10032.www1.hp.com/ctg/Manual/c01955447.pdf, Nov. 30, 2009, 66 pages.

Dressler, M., et at., "Temperature Distribution in Powder Beds During 3D Printing," Rapid Prototyping Journal, 2010, vol. 16, No. 5, pp. 328-336.

European Patent Office, International Search Report and Written Opinion for PCT/EP2014/070968 dated Jan. 20, 2015 (15 pages).

Gibson, I., et al., "Low-Cost Machine Vision Monitoring of the SLS Process," Department Mechanical Engineering, The University of Hong Kong, Solid Freeform Fabrication Symposium, 1997, pp. 59-66.

Gong, X., et al., "Review on Powder-based Electron Beam Additive Manufacturing Technology," Proceedings of the ASME 2012 International Symposium on Flexible Automation, Jun. 18-20, 2012, St. Louis, MO, ISFA2012-7256, pp. 1-9.

http://www.mobile01.com/topicdetail.php?f=368&t=3593470.

International Search Report & Written Opinion received in PCT Application No. PCT/US2014/034315, dated Oct. 15, 2014, 11 pages.

International Search Report and Written Opinion dated May 1, 2015, PCT Patent Application No. PCT/US2014/056789 filed Sep. 22, 2014, Korean intellectual Property Office.

International Search Report and Written Opinion for International Application No. PCT/US2014/014044 dated Aug. 28, 2015, 11 pages.

International Search Report and Written Opinion for International Application No. PCT/US2014/014076 dated Aug. 28, 2015, 10 pages.

International Search Report and Written Opinion for International Application No. PCT/US2014/032328 dated Oct. 15, 2014, 10 pages.

Kim, J. S., et al., "3D Printing Method of Multi Piezo Head Using a Photopolymer Resin," International Conference on Control, Automation and Systems 2007, Oct. 17-20, 2007, pp. 1-4.

Korean Intellectual Property Office, International Search Report and Written Opinion for PCT/US2014/040212 dated Oct. 16, 2014 (11 pages).

Korean Intellectual Property Office, International Search Report and Written Opinion for PCT/US2014/053405 dated Feb. 26, 2015 (12 pages).

Korean Intellectual Property Office, International Search Report for PCT/US2014/032341 dated Oct. 13, 2014 (3 pages).

McNulty, C. M., et al., "Toward the Printed World: Additive Manufacturing and Implications for National Security", Defense horizon, National defense university, Sep. 2012, pp. 17.

Rajon, D. et al., An investigation of the potential of rapid prototyping technology for image-guided surgery, Jrnl. of Applied Clinical Medical Physics vol. 7 No. 4 (2006) 19 pgs.

Ribeiro, F., "3D Printing with Metals," Feb. 1998, vol. 9, Issue 1, pp. 312-338.

The International Search Report and Written Opinion for International application No. PCT/EP2014/051938 dated Sep. 30, 2014 (12 pages).

UK Intellectual Property Office, Examination Report for GB1612116.2 dated Jul. 10, 2017 (8 pages).

UK Intellectual Property Office, Examination Report for GB1612116.2 dated Jul. 26, 2018 (10 pages).

UK Intellectual Property Office, Examination Report for GB1612116.2 dated Nov. 7, 2017 (8 pages).

UK Intellectual Property Office, Examination Report for GB1612116.2 dated Sep. 20, 2018 (9 pages).

UK Intellectual Property Office, Examination Report for GB1809984.6 dated Jul. 26, 2018 (16 pages).

Wegner, A., et al., "Process Monitoring in Laser Sintering Using Thermal Imaging," Aug. 29, 2011, Institute for Product Engineering, University of Duisburg Essen, Germany, pp. 1-10.

3D Systems Company, Sinterstation Pro SLS System [online], Apr. 8, 2008, Retrieved from the Internet <http://www.3dsystems.com/products/datafiles/sinterstation_pro/DS-Sinterstation_Pro_US_engl.pdf> [retrieved on Feb. 5, 2014] (2 pages).

European Patent Office, International Search Report for PCT/EP2014/050841 dated Sep. 25, 2014 (4 pages).

Korean Intellectual Property Office, International Search Report and Written Opinion for PCT/US2014/014025 dated Oct. 15, 2014 (11 pages).

Korean Intellectual Property Office, International Search Report and Written Opinion for PCT/US2014/032333 dated Oct. 16, 2014 (12 pages).

Wimpenny, D.I. et al.; "Selective Infrared Sintering of Polymeric Powders using Radiant IR Heating & Ink Jet Printing"; Sep. 14, 2006; 11 pages.

* cited by examiner

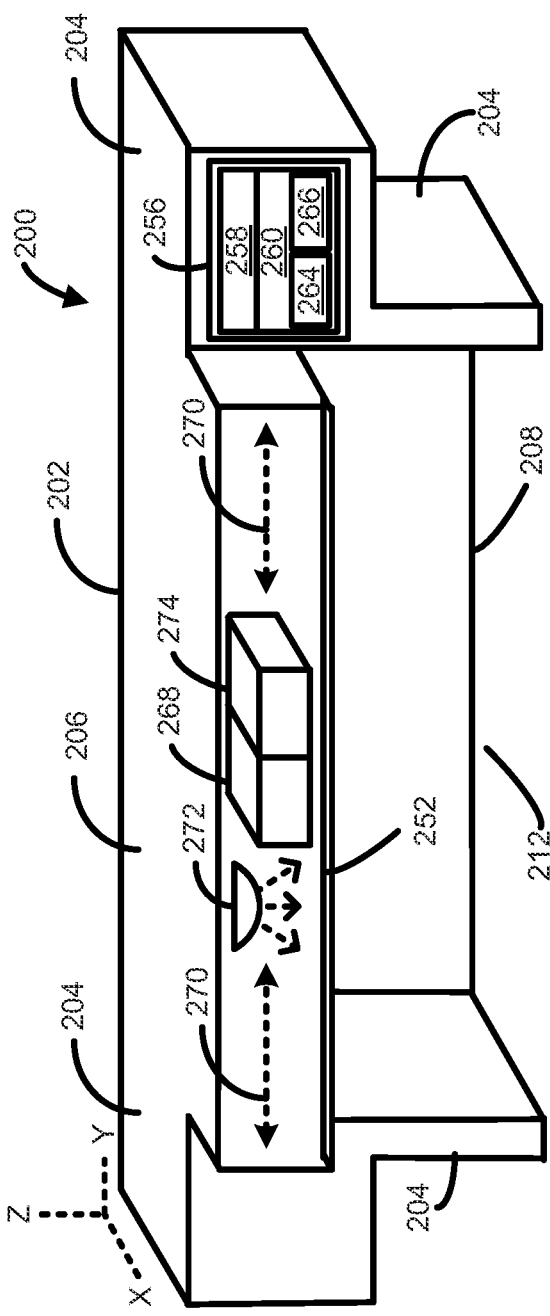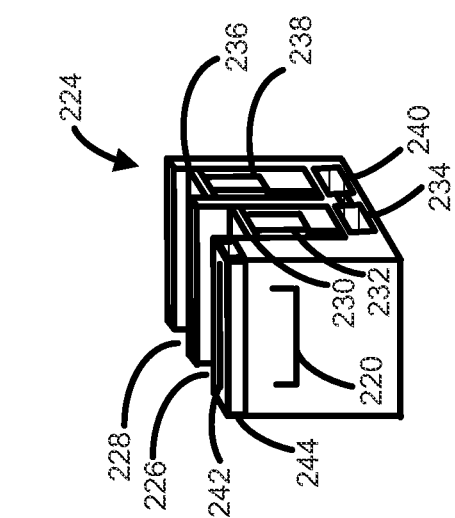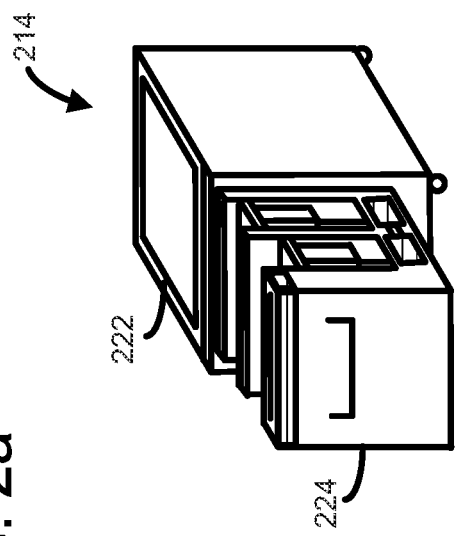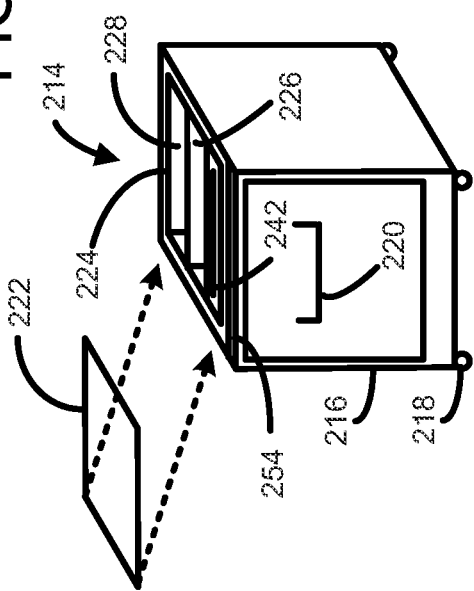

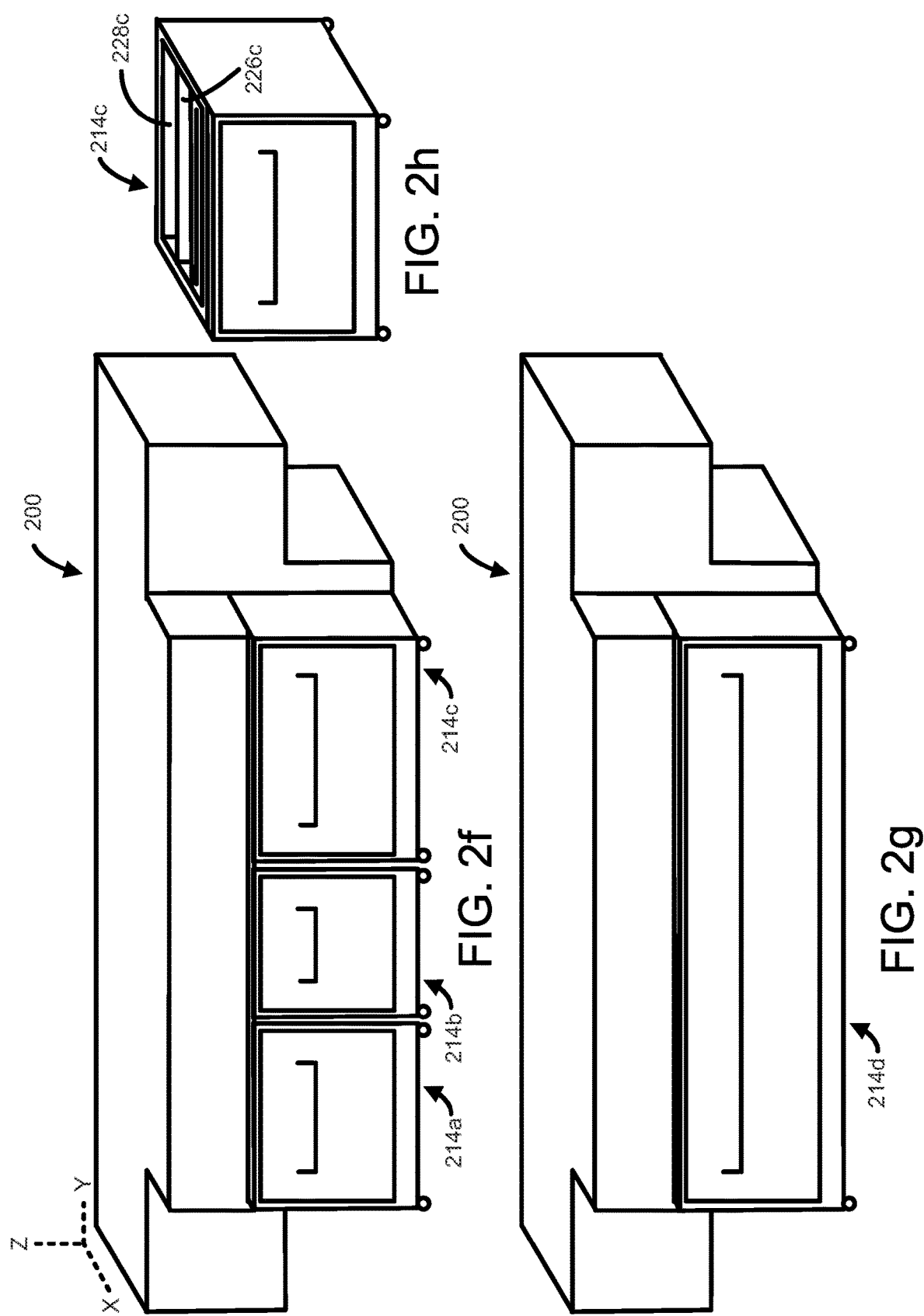

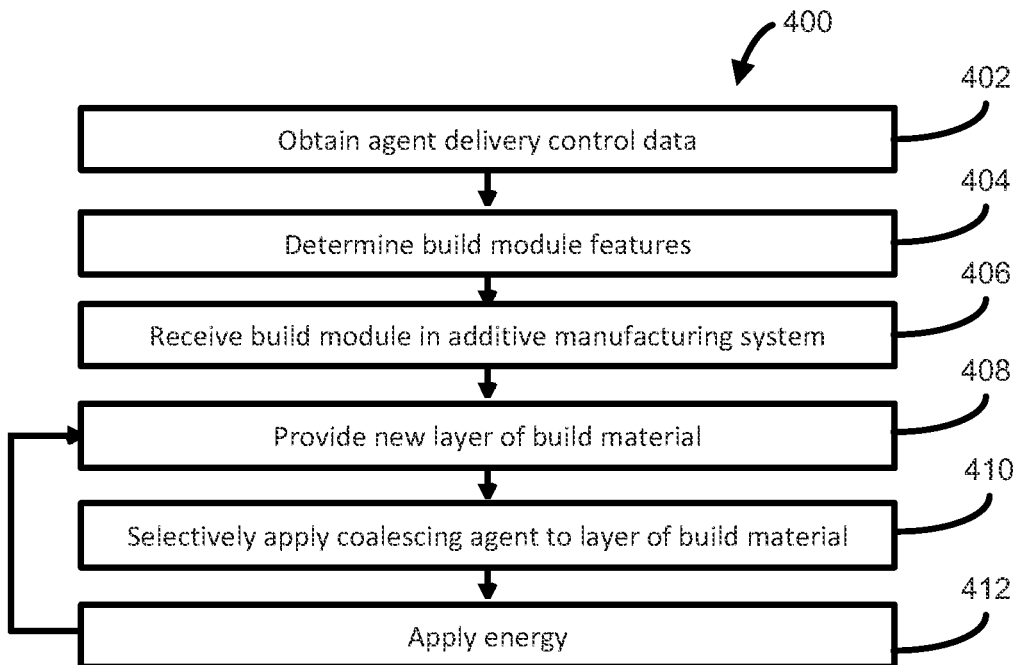
FIG. 4
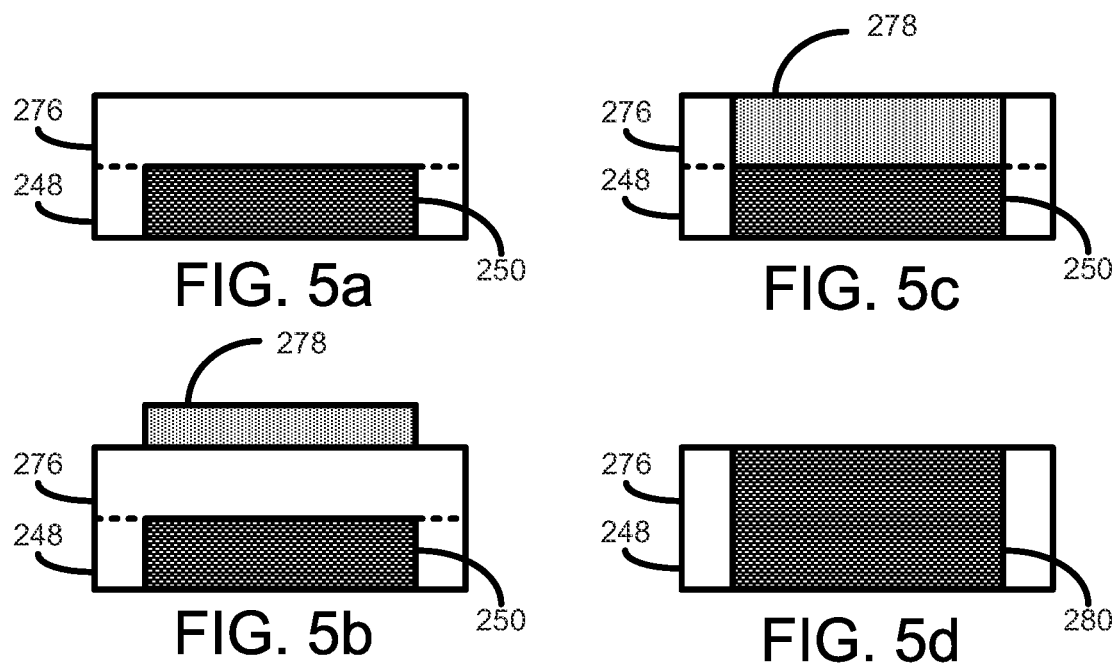
FIG. 5a
FIG. 5b
FIG. 5c
FIG. 5d

US 11,618,217 B2

GENERATING THREE-DIMENSIONAL OBJECTS

RELATED APPLICATIONS

This application is a Continuation Application of U.S. patent application Ser. No. 15/112,141 filed on Jul. 15, 2016, entitled "GENERATING THREE-DIMENSIONAL OBJECTS," the entire contents of which are hereby incorporated herein by reference, which is the National Stage of PCT Application No. PCT/US2014/032333 filed on Mar. 31, 2014, entitled "GENERATING THREE-DIMENSIONAL OBJECTS," which claims the benefit of PCT Application No. PCT/US2014/014025 filed on Jan. 31, 2014, entitled "GENERATING THREE-DIMENSIONAL OBJECTS", the entire contents of which are hereby incorporated herein by reference, and which itself claims the benefit of PCT Application No. PCT/EP2014/050841 filed on Jan. 16, 2014, entitled "GENERATING A THREE-DIMENSIONAL OBJECT", the entire contents of which are hereby incorporated herein by reference.

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Some examples are described with respect to the following figures:

FIG. 1a-c each are a simplified schematic of a build module for generating a three-dimensional object according to some examples;

FIG. 2a is a simplified perspective view on of an additive manufacturing system according to some examples;

FIG. 2b is a simplified perspective view of a removable build module for an additive manufacturing system according to some examples;

FIG. 2c is a simplified perspective view of a removable build module for an additive manufacturing system according to some examples;

FIG. 2d is a simplified perspective view of a build assembly of a build module according to some examples;

FIG. 2f is a simplified perspective view on of additive manufacturing system having received removable build modules according to some examples;

FIG. 2g is a simplified perspective view on of additive manufacturing system having received a removable build module according to some examples;

FIG. 2h is a simplified perspective view of a removable build module for an additive manufacturing system according to some examples;

FIG. 4 is a flow diagram illustrating a method of three-dimensional object according to some examples; and FIGS. 5a-d show a series of cross-sectional side views of layers of build material according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Using an additive manufacturing system, a three-dimensional object may be generated through the solidification of portions of one or more successive layers of build material. The build material can be powder-based and the properties of generated objects are dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In other examples, other methods of solidification may be used.

However, some additive manufacturing systems may, for example, have designs that do not provide sufficient flexibility and speed. For example, printing continuity may be difficult to maintain when build material needs re-filling or the system needs cleaning. Additionally, there may be time delays between printing jobs. Moreover, in some examples these systems may have designs requiring a high degree of user interaction such as handling build material and cleaning.

Accordingly, the present disclosure provides build modules that are removably insertable into an additive manufacturing system. The modular design may, for example, provide versatility by allowing different types of build modules to be inserted such as different sizes and/or multiple build modules at the same time. The modular design may also enable high productivity by allowing faster use and fewer interruptions in continued use of the system, for example allowing successive print jobs to be completed with little or no time delays in between. The build modules may be provided with housings in which a build chamber, build material chamber, and/or motor may be provided for movement of the chambers. This design may allow faster cleaning of a build module when it is removed. The build modules may also be easily insertable and removable to and from an additive manufacturing system.

Figure 1A:
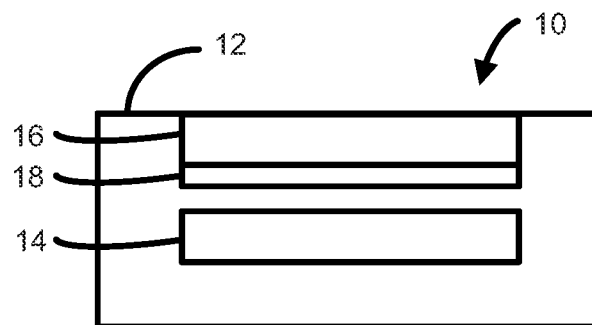

FIG. 1a is a simplified schematic of a build module 10 according to some examples. The build module 10 may include a housing 12 and a build material chamber 14 in the housing 12 to hold build material. The build module may include a build chamber 16 in the housing 12. The build material chamber 14 may be beneath the build chamber 16. The build chamber 16 may include a moveable support member 18 to receive successive layers of the build material from a build material distributor. The build module 10 may be removably insertable into a build receiver of an additive manufacturing system to allow the additive manufacturing system to solidify a portion the successive layers to be received onto the movable support member 18.

Figure 1B:
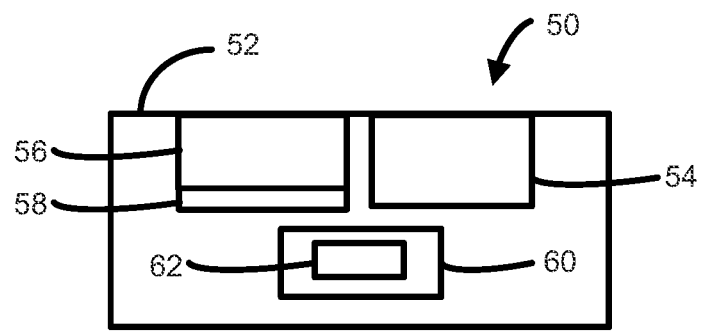

FIG. 1b is a simplified schematic of a build module 50 according to some examples. The build module 50 may include a housing 52 and a build material chamber 54 in the housing 52 to hold build material. The build module 50 may include a build chamber 56 in the housing 52. The build chamber 56 comprising a moveable support member 58 to receive successive layers of the build material from a build material distributor. The build module 50 may include a computer-readable medium 60 in the housing 52. The computer-readable medium 60 may include build module data 62 representing a feature of the build module 50. The build module 50 may be removably insertable into a build volume of an additive manufacturing system to allow the additive manufacturing system to solidify a portion of the successive layers to be received onto the movable support member 58.

Figure 1C:
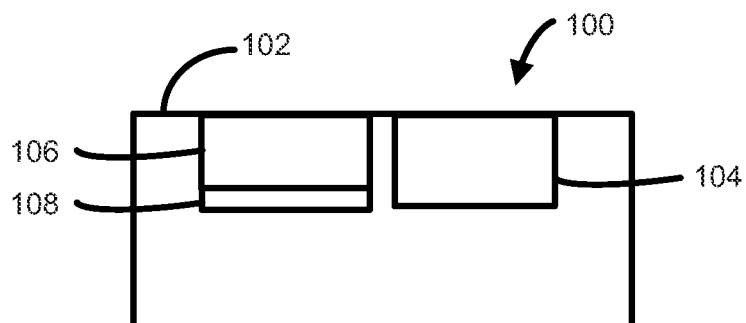

FIG. 1c is a simplified schematic of a build module 100 according to some examples. The build module 100 may include a housing 102 and a build material chamber 104 in the housing 102 to hold build material. The build module 100 may each include a build chamber 106 in the housing 102. Each build chamber 106 may include a moveable support member 108 to receive successive layers of the build material from a build material distributor. The build module 100 may be removably insertable into a build volume of an additive manufacturing system at a same time as another such build module to allow the additive manufacturing system to solidify a portion of the successive layers to be received onto the movable support member 108.

FIG. 2a is a simplified perspective view of an additive manufacturing system 200 according to some examples. The additive manufacturing system 200 may include a housing 202. The housing 202 may house various components, such as an agent distributor and other components, as will be discussed in more detail.

The housing 202 may include side housing portions 204, a central housing portion 206, and a back housing portion 208. Surfaces of these housing elements may define build receiver comprising a receiving volume. FIG. 2a shows the receiving volume 212 having a cuboid shape, but in other examples the receiving volume 212 may have other shapes depending on the configuration and shapes of the side housing portions 204, a central housing portion 206, and a back housing portion 208. As shown in FIG. 2a, the central housing portion 206 and the receiving volume 212 may extend to a sufficient length along the y-axis direction such that the system 200 may be considered a wide-format system. In other examples, the central housing portion 206 and the receiving volume 212 may have shorter or longer lengths along the y-axis direction. Thus, in some examples, the system 200 may be a smaller desktop system.

The additive manufacturing system 200 may include a system controller 256, which may include a processor 258 for executing instructions such as those described in the methods herein. The processor 258 may, for example, be a microprocessor, a microcontroller, a programmable gate array, an application specific integrated circuit (ASIC), a computer processor, or the like. The processor 258 may, for example, include multiple cores on a chip, multiple cores across multiple chips, multiple cores across multiple devices, or combinations thereof. In some examples, the processor 258 may include at least one integrated circuit (IC), other control logic, other electronic circuits, or combinations thereof.

The controller 256 may support direct user interaction. For example, system 200 may include user input devices coupled to the processor 258, such as one or more of a keyboard, touchpad, buttons, keypad, dials, mouse, trackball, card reader, or other input devices. Additionally, the system 200 may include output devices coupled to the processor 258, such as one or more of a liquid crystal display (LCD), printer, video monitor, touch screen display, a light-emitting diode (LED), or other output devices. The output devices may be responsive to instructions to display textual information or graphical data.

The processor 258 may be in communication with a computer-readable storage medium 260 via a communication bus. The computer-readable storage medium 260 may include a single medium or multiple media. For example, the computer readable storage medium 260 may include one or both of a memory of the ASIC, and a separate memory in the controller 256. The computer readable storage medium 260 may be any electronic, magnetic, optical, or other physical storage device. For example, the computer-readable storage medium 260 may be, for example, random access memory (RAM), static memory, read only memory, an electrically erasable programmable read-only memory (EEPROM), a hard drive, an optical drive, a storage drive, a CD, a DVD, and the like. The computer-readable storage medium 260 may be non-transitory. The computer-readable storage medium 260 may store, encode, or carry computer executable instructions 262 that, when executed by the processor 258, may cause the processor 258 to perform any one or more of the methods or operations disclosed herein according to various examples.

FIG. 2b-c are simplified perspective views of a removable build module 214 for an additive manufacturing system 200 according to some examples. The build module 214 may include a housing 216. Wheels 218 may be attached to a bottom surface of the housing 216 such that the build module 214 may be rolled as a trolley. Alternatively, fixed legs may be provided rather than wheels. However, in some examples no wheels 218 or legs may be attached. A cover 222 may be removably coupled to the housing 216 to form part of the top surface of the build module 214. When the cover 222 is removed, as shown in FIG. 2b, a build assembly 224, which may be contained in the housing 216, may be exposed. FIG. 2c shows the cover attached. The housing 216 and cover 222 may prevent build material from unintentionally escaping from the build module 214.

As shown in FIG. 2c, the build assembly 224 may be removable as a drawer from the housing 216 by a user using a handle 220 attached to a side surface of the build assembly 224. Additional handles may be provided on the surface of the build assembly 224. In other examples, an automatic and/or electronic mechanism may be used to open the drawer automatically when, for example, a user provides input such as pressing a button on the housing 216, build assembly 224, or on the system 200.

Figure 2E:
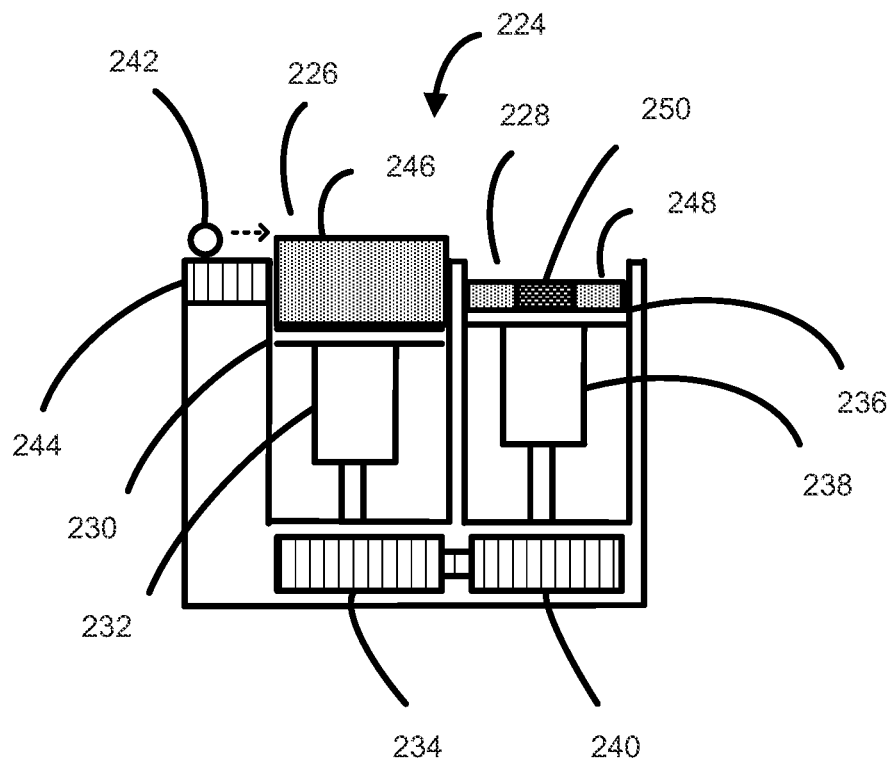
FIG. 2e is a simplified side view of a build assembly of a build module according to some examples.

FIG. 2d-e respectively are a simplified perspective view and a simplified side view of a build assembly 224 of a build module 214 according to some examples. As shown, the build assembly 224 has been fully removed from the housing 216. The build assembly 224 may include a build material chamber 226 and a build chamber 228.

A support member 230 may be provided in the build material chamber 226. A piston 232 may be attached to a bottom surface of the support member 230. A motor 234 may drive the piston 232 to cause the support member 230 to be movable along the z-axis. Similarly, a support member 236 may be provided in the build chamber 228. A piston 238 may be attached to a bottom surface of the support member 236. A motor 240 may drive the piston 238 to cause the support member 236 to be movable along the z-axis. In one example the support members 230 and 236 may have dimensions in the range of from about 10 cm by 10 cm up to 100 cm by 100 cm. In other examples the support members 230 and 236 may have larger or smaller dimensions.

FIG. 2e shows build material 246 in storage on the top surface of the support member 230 in the build material chamber 226. FIG. 2e also shows a previously deposited layer 248 of build material on the top surface of the support member 236 in the build chamber 228. The previously deposited layer 248 of build material includes a portion 250 that has been processed and solidified into part of a three-dimensional object using the additive manufacturing system 200.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powder ceramic materials, powdered glass materials, powdered resin material, powdered polymer materials, and the like. It should be understood, however, that the examples described herein are not limited to powder-based materials or to any of the materials listed above. In other examples the build material may be a paste or a gel. According to one example a suitable build material may be a powdered semi-crystalline thermoplastic material.

The build assembly 224 may include a build material distributor 242, such as, for example, a wiper blade or a roller. The build material distributor 242 may be driven by a motor 244 to provide, e.g. deliver and/or deposit, successive layers of build material from the support member 230 in the build material chamber 226 to the support member 236 in the build material chamber 228. However, in other examples, the build material distributor 242 may instead be a component of the system 200 and attached to or in the housing 202.

Turning back to FIG. 2a, a fastener member 252 may be attached to the housing 22 at the bottom surface of the central housing portion 206. Alternatively or additionally, fastener members may be attached the side housing portions 204 and/or the back housing portion 208. In FIG. 2a, the fastener member 252 is shown longitudinally extending along the length of the central housing portion 206, but in other examples the fastener member 252 may have other configurations. In some examples, multiple separate fastener members 252 may be provided at different points along the length of the bottom surface of the central housing portion 206.

Turning back to FIG. 2b, a fastener member 254 may be attached to the top surface of the housing 216. Alternatively or additionally, fastener members may be attached to any other surfaces of the housing 216, including any of the four side surfaces. In FIG. 2b, the fastener member 254 is shown longitudinally extending along the length of the housing 216, but in other examples the fastener member 254 may have other configurations. In some examples, multiple separate fastener members 254 may be provided at different points along the length of the top surface of the housing 216.

Together, the fastening members 252 and 254 may be coupled such that the additive manufacturing system 200 can removably couple to and removably receive the build module 214 in the receiving volume 212. As shown, the build module 214 may be received laterally or generally laterally, e.g. horizontally or generally horizontally, into the receiving volume 212. The fasteners 252 and 254 may be magnetic fasteners, mechanical fasteners, and/or other types of fasteners.

If the fasteners 252 and 254 are magnetic fasteners, they may each be magnetic, meaning that they each may be made of a suitable material such that it experiences a force in the presence of a magnetic field, and/or itself generates a magnetic field. Thus, when the fasteners 252 and 254 are in sufficient proximity, they may be attracted to lock the build module 214 in the additive manufacturing system 200. For example, the fasteners 252 and 254 may include permanent magnets such as ferromagnets, or anti-ferromagnets, ferrimagnets, paramagnets, diamagnets, or electromagnets.

If the fasteners 252 and 254 are mechanical fasteners, one of the fasteners 252 and 254 may be a latch member and the other a receiving member. For example, the latch may be inserted into or attached to the receiving member to lock the build module 214 in the additive manufacturing system 200.

When the build module 214 is inserted in the receiving volume 212 of the system 200, the cover 222 is intended to be removed such that components in the system such as agent distributors, energy sources, heaters, and sensors may be able to interact with the build chamber 228 and any build material therein, as will be discussed.

FIGS. 2f-g are simplified perspective views of additive manufacturing system having received removable build modules according to some examples. In general, build modules may have any length along the x-axis direction or y-axis direction. For example, as shown, build modules 214a-d of various sizes may have any length along the x-axis direction. For example, in FIG. 2g, a single build module 214d has a length along the y-axis direction that allows it to fill the entire y-axis length of the receiving volume 212 when inserted in the system 200. In FIG. 2f, multiple build modules 214a-c with smaller lengths along the y-axis direction may be lined up along the y-axis direction to collectively fill the entire receiving volume 212. Thus, in FIG. 2f, build chambers and support members of the build modules 214-a-c may be lined up in series. Additionally, in FIG. 2f, build modules of different lengths are shown, for example build modules 214a-c have different length relative to each other.

FIG. 2h is a simplified perspective view of the removable build module 214c for an additive manufacturing system according to some examples. The build module 214c is shown removed from the system 200 in FIG. 2f. As shown, by virtue of being longer than the build module 214 of FIGS. 2b-2e, the build module 214c may have a build material chamber 226c that is longer along the y-axis direction than the build material chamber 226 of build module 214, and may have a build chamber 228c that is longer along the y-direction than the build material chamber 228. Although not shown, the build module 214d may have chambers spanning the entire length of the build module 214d along the y-axis direction.

Additionally, although not shown, the build modules and chambers may also vary in width along the x-axis direction.

Figure 3:
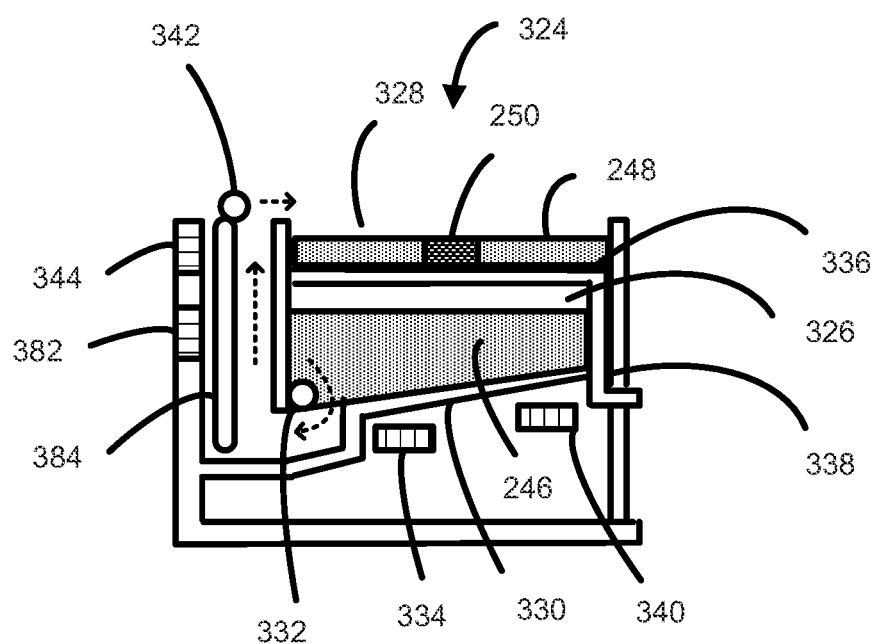
FIG. 3 is a simplified side view of a build assembly of a build module according to some examples.

In some examples, different configurations of build modules and/or build assemblies may be used. FIG. 3 is a simplified side view of a build assembly 324 of a build module according to some examples. In addition to being able to removably receive the build assembly 224, the housing 216 of FIGS. 2b-c may also be able to removably receive the build assembly 324. When the build assembly 324 is inside the housing 216, the cover 222 may be removable from the housing 216 to expose the build assembly 324 and its build chamber 328.

The build assembly 324 may be removable as a drawer from the housing 216 by a user using a handle attached to a side surface of the build assembly 324. Additional handles may be provided on the surface of the build assembly 324. In other examples, an automatic and/or electronic mechanism may be used to open the drawer automatically when, for example, a user provides input such as pressing a button on the housing 216, build assembly 324, or system 200.

In FIG. 3, the build assembly 324 has been fully removed from the housing 216. The build assembly 324 may include a build material chamber 326 and a build chamber 328. The build material chamber 326 may be beneath the build material chamber 326. This may, for example, allow the build chamber 328 to be wide such that wide layers of build material may be delivered thereto.

A support member 330 may be provided in the build material chamber 326. Build material 246 is shown in storage on the top surface of the support member 330 in the build material chamber 326. The support member 330 may be angled to allow build material 246 to slide down by the force of gravity. A support member 336 may be provided in the build chamber 328. A previously deposited layer 248 of build material is shown on the top surface of the support member 336 in the build chamber 328. The previously deposited build material includes the portion 250 that has been processed and solidified into part of a three-dimensional object using the additive manufacturing system 200. A piston 338 may be attached to a bottom surface of the support member 336. A motor 340 may drive the piston 338 to cause the support member 336 to be movable along the z-axis. In one example the support members 330 and 336 may have dimensions in the range of from about 10 cm by 10 cm up to 100 cm by 100 cm. In other examples the support members 330 and 336 may have larger or smaller dimensions.

One or more build material distributors 332, 384, and 342 may be used to provide, e.g. deliver and/or deposit, successive layers of build material from the support member 330 in the build material chamber 326 to the support member 336 in the build material chamber 326. For example, the build material distributor 332, for example a rotatable ball, wheel, or roller, may be attached in the build material chamber 326. A motor 234 may driver the build material distributor 332 to rotate to move the build material 246 as shown by the curved arrow. A build material distributor 384 attached to the assembly 324, for example, a conveyor, may be driven by a motor 344 to then move the build material 246 upwards in the z-axis direction, as shown by the arrow. In other examples, the build material distributor 384 may be rotary system having blades which, when rotated, move the build material 246 upwards in the z-axis direction. A build material distributor 342 attached to the build assembly 324, for example a wiper blade or a roller, may be driven by a motor 344 to move longitudinally in the x-axis direction to roll build material onto the support member 336 in the build material chamber 326. In some examples, the build material distributor 342 may instead be a component of the system 200 and attached to or in the housing 202.

In some examples, although not shown, any of the build assemblies described herein may use build material distributors providing pneumatic or hydraulic transport of build material, wherein such build material distributors may be driven by motors.

In some examples, the build module 214 may include a controller and computer-readable medium having similar features as the controller 256 and computer-readable medium 260 described earlier. In such examples, the computer-readable medium may store data and/or instructions specifying features of the build module 214, for example its size, the size of each of its chambers, the type of build material stored provided in its build material chamber, and the like. These data and/or instructions may be stored for access by the controller 256 when the build module 214 is inserted in the system 200 for generating a three-dimensional object. In some examples, an input device, having similar features as the input devices of the controller 256 discussed earlier, on the build module may receive input from a user regarding the type of build material stored in the build module 214. In some examples, a sensor on the build module 214 may automatically detect the type of build material.

The additive manufacturing system 200 may include a coalescing agent distributor 268 to selectively deliver coalescing agent to successive layers of build material provided on one or more support members 236 in one or more build chambers 228, which will be discussed. A coalescing agent is a material that, when a suitable amount of energy is applied to a combination of build material and coalescing agent, may cause the build material to coalesce and solidify. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. Examples of inks comprising visible light enhancers are dye based colored ink and pigment based colored ink, such as inks commercially known as CM993A and CE042A available from Hewlett-Packard Company.

The controller 256 may control the selective delivery of coalescing agent to a layer of provided build material in accordance with instructions comprising agent delivery control data 266 stored in the computer-readable medium 260.

The agent distributor 268 may be a printhead, such as a thermal printhead or a piezo inkjet printhead. The printhead may have arrays of nozzles. In one example, a printhead such as those commonly used in commercially available inkjet printers may be used. In other examples, the agents may be delivered through spray nozzles rather than through printheads. Other delivery mechanisms may be used as well.

The agent distributor 268 may be used to selectively deliver, e.g. deposit, coalescing agent when in the form of suitable fluids such as liquids. In some examples, the agent distributor 268 may be selected to deliver drops of agent at a resolution of between 300 to 1200 dots per inch (DPI), for example 600 DPI. In other examples the agent distributor 268 may be selected to be able to deliver drops of agent at a higher or lower resolution. In some examples, the agent distributor 268 may have an array of nozzles through which the agent distributor 268 is able to selectively eject drops of fluid. In some examples, each drop may be in the order of about 10 pico liters (pl) per drop, although in other examples an agent distributor 268 that is able to deliver a higher or lower drop size may be used. In some examples an agent distributor 268 that is able to deliver variable size drops may be used.

In some examples, the agent distributor 268 may be an integral part of the system 200. In some examples, the agent distributor 268 may be user replaceable rather than fixed, in which case it may be removably receivable, e.g. insertable, into a suitable agent distributor receiver, e.g. interface module, of the system 200.

In the example of FIG. 2*a*, the agent distributor 268 has a length in the x-axis direction that enables it to span the whole width in the x-axis direction of the support member 236 or 336 of the build module 214 in a so-called page-wide array configuration. In one example this may be achieved through a suitable arrangement of multiple printheads. In other examples a single printhead having an array of nozzles having a length to enable them to span the width of the support member 236 or 336 may be used. In other examples, the agent distributor 268 may have a shorter length that does not enable them to span the whole width of the support member 236 or 336.

The agent distributor 268 may be mounted on a moveable carriage to enable it to move bi-directionally across the entire length of the series of one or more support members 236 or 336 along the illustrated y-axis, as shown by arrows 270. This enables selective delivery of coalescing agent across the whole width and length of the support members 236 or 336 in a single pass.

It should be noted that the term 'width' used herein is used to generally denote the shortest dimension in the plane parallel to the x and y axes illustrated in FIGS. 2*a-e*, whilst the term 'length' used herein is used to generally denote the longest dimension in this plane. However, it will be understood that in other examples the term 'width' may be interchangeable with the term 'length'. For example, in other examples the agent distributor 268 may have a length that enables it to span the whole length of the support member 236 or 336 whilst the moveable carriage may move bi-directionally across the width of the support members 236 or 336.

In another example the agent distributor 268 does not have a length that enables it to span the whole width of the support member 236 or 336 but is additionally movable bi-directionally across the width of the support member 236 or 336 in the illustrated x-axis. This configuration enables selective delivery of coalescing agent across the whole width and length of the support member 236 or 336 using multiple passes. Other configurations, however, such as a page-wide array configuration, may enable three-dimensional objects to be created faster.

The coalescing agent distributor 268 may include a supply of coalescing agent or may be connectable to a separate supply of coalescing agent.

In some examples, there may be additional coalescing agent distributors, such as the agent distributor 274. In some examples, the distributors of system 200 may be located on the same carriage, either adjacent to each other or separated by a short distance. In other examples, two or more carriages each may contain one or more distributors. For example, each distributor may be located in its own separate carriage. Any additional distributors may have similar features as those discussed earlier with reference to the coalescing agent distributor 268. However, in some examples, different agent distributors may deliver different coalescing agents, for example.

The system 200 may additionally include an energy source 272 attached to the housing 202. The energy source 272 may be to apply energy to build material to cause the solidification of portions of the build material according to where coalescing agent has been delivered or has penetrated. In some examples, the energy source 272 is an infra-red (IR) radiation source, near infra-red radiation source, or halogen radiation source. In some examples, the energy source 272 may be a single energy source that is able to uniformly apply energy to build material deposited on the support member 236 or 336. In some examples, the energy source 272 may comprise an array of energy sources.

In some examples, the energy source 272 is configured to apply energy in a substantially uniform manner to the whole surface of a layer of build material. In these examples the energy source 272 may be said to be an unfocused energy source. In these examples, a whole layer may have energy applied thereto simultaneously, which may help increase the speed at which a three-dimensional object may be generated.

In other examples, the energy source 272 is configured to apply energy in a substantially uniform manner to a portion of the whole surface of a layer of build material. For example, the energy source 272 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 272 may be mounted on the moveable carriage.

In other examples, the energy source 272 may apply a variable amount of energy as it is moved across the layer of build material, for example in accordance with agent delivery control data 266. For example, the controller 210 may control the energy source only to apply energy to portions of build material on which coalescing agent has been applied.

In further examples, the energy source 272 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

In some examples, the system 200 may additionally include a heater or pre-heater to emit heat to maintain build material deposited on the support members 236 within a predetermined temperature range. The heater may have an array of heating units. The heating units may each be any suitable heating unit, for example a heat lamp such as an infra-red lamp. The configuration may be optimized to provide a homogeneous heat distribution toward the area spanned by the build material. Each heating unit, or groups of heating units, may have an adjustable current or voltage supply to variably control the local energy density applied to the build material surface.

FIG. 4 is a flow diagram illustrating a method 400 of generating a three-dimensional object according to some examples. The method may be computer implemented. In some examples, the orderings shown may be varied, such that some steps may occur simultaneously, some steps may be added, and some steps may be omitted. In describing FIG. 3, reference will be made to FIGS. 2*a*, 2*e*, 3, and 5*a-d*. FIGS. 5*a-d* show a series of cross-sectional side views of layers of build material according to some examples.

At 402, the controller 210 may obtain agent delivery control data 266. The agent delivery control data 266 may define for each slice of the three-dimensional object to be generated the portions or the locations on the build material, if any, at which coalescing agents are to be delivered. The agent delivery control data 266 may be derived by a suitable three-dimensional object processing system in or outside of the system 200. In some examples, the agent delivery control data 266 may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

At 404, a computer-readable medium on the build module 214 may determine and/or store build module data representing build module features such as the type of build material being used, for example based on user input or detection by a sensor. Other features of the build module, such as physical dimensions of the build module, may be pre-stored on the computer-readable medium, as discussed earlier.

At 406, one or more build modules 214 may be received by the system 200. The controller 256 of the system 200 may access the computer-readable media of build modules 214 to discover the build module data.

At 408, a layer 276 of build material may be provided, as shown in FIG. 5a. For example, the controller 210 may control the build distributor 242 to provide the layer 276 on a previously completed layer 248 shown in FIGS. 2e and 4a. The completed layer 248 may include a solidified portion 250. Although a completed layer 248 is shown in FIGS. 5a-d for illustrative purposes, it is understood that the blocks 408 to 412 may initially be applied to generate the first layer 248.

In some examples, such as if the build assembly 224 is used, the layer 276 may be delivered as follows. With reference to FIGS. 2e and 4a, the support member 230 in the build material chamber 226 may be positioned by the piston 232 in the z-axis direction in such a way that a portion of the stored build material 246 extends beyond the top edge of the build assembly 224. The support member 236 in the build chamber 228 may be positioned by the piston 238 in the z-axis direction in such a way that a predetermined gap is provided above the previously deposited layer 248 of build material. The build material distributor 242 may then move longitudinally in the x-axis direction to roll the extended portion of the stored build material 246 into the predetermined gap to create the new layer 276 in the build chamber 228. The delivery may be based on the data and/or instructions regarding features of the build module stored in the computer-readable medium of the build module.

In some examples, such as if the build assembly 324 is used, the layer 276 may be delivered as follows. With reference to FIGS. 3 and 4, the support member 330 in the build material chamber 326 may be positioned by the piston 338 in the z-axis direction in such a way that a portion of the stored build material 246 extends beyond the top edge of the build assembly 324. The support member 336 in the build chamber 328 may be positioned by the piston 338 in the z-axis direction in such that a predetermined gap is provided above the previously deposited layer 248 of build material. Then, the build material distributors 332, 384, and 342 may be used to deliver the layer 276. The stored build material 246 may be moved along the arrows in FIG. 3 and rolled into the predetermined gap to create the new layer 276 in the build chamber 228. The delivery may be based on the data and/or instructions regarding features of the build module stored in the computer-readable medium of the build module.

At 410, a coalescing agent 278 may be selectively delivered to one or more portions of the surface of the layer 276 of build material, as shown in FIG. 5b. The selective delivery of the coalescing agent 278 may be performed in patterns on portions of the layer 276 that the agent delivery control data 266 may define to become solid to form part of the three-dimensional object being generated. "Selective delivery" means that coalescing agent may be delivered to selected portions of the surface layer of the build material in various patterns. The patterns may be defined by the agent delivery control data 266, and based on the data and/or instructions regarding features of the build module stored in the computer-readable medium of the build module.

FIG. 5c shows coalescing agent 278 having penetrated substantially completely into the layer 276 of build material, but in other examples, the degree of penetration may be less than 100%.

At 412, a predetermined level of energy may be temporarily applied to the layer 276 of build material. In various examples, the energy applied may be infra-red or near infra-red energy, microwave energy, ultra-violet (UV) light, halogen light, ultra-sonic energy, or the like. The temporary application of energy may cause portions of the build material on which coalescing agent 278 has been delivered or has penetrated to heat up above the melting point of the build material and to coalesce. Upon cooling, the portions which have coalesced become solid and form part of the three-dimensional object being generated. As discussed earlier, one such portion 250 may have been generated in a previous iteration. The heat absorbed during the application of energy may propagate to the previously solidified portion 250 to cause part of portion 250 to heat up above its melting point. This effect helps create a portion 280 that has strong interlayer bonding between adjacent layers of solidified build material, as shown in FIG. 5d.

After a layer of build material has been processed as described above, new layers of build material may be provided on top of the previously processed layer of build material. In this way, the previously processed layer of build material acts as a support for a subsequent layer of build material. The process of blocks 408 to 412 may then be repeated to generate a three-dimensional object layer by layer.

Additionally, at any time during blocks 408 to 412, additional build modules 214 may be received by the system 200 such as at block 406. Thus, while the method 400 is iterating through blocks 408 to 412, a parallel instance of the method 400 may proceed, such that the system 200 may be performing multiple print jobs at once by different three dimensional objects on different build modules 214. In other examples, immediately after the first instance of the method 400 has completed and generated a three-dimensional object, the second instance of the method 400 may proceed with blocks 408 to 412 such that the second three-dimensional object is generated immediately after the first one is completed, with little or no time delay in between.

Additionally, in some examples, there may be little or no time delay even if build modules 214 require cleaning or re-fills during generation of three-dimensional objects. For example, if a build module 214 needs to be cleaned or re-filled, that build module 214 may be removed from the system 200, while the system 200 continues to generate other three dimensional objects in other build modules 214. Additionally, the design of the build module 214, for example its fully functional build system including motors 234 and 240 in FIGS. 2d-e or motors 334, 340, 344, and 344 of FIG. 3, may allow the build module 214 to be able to be cleaned quickly and easily. For example, the housing 216 may aid in keeping build material from escaping into undesired locations in the build module 214. Moreover, the build module 214 may be inserted in a cleaning device which may, for example, automatically clean the parts of the build module 214 while the motors are running such that build material may shake out from the components of the build module 214. In some examples, manual steps in cleaning may also be performed, for example while running the motors.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A build module comprising:
   a housing having a top and a bottom;
   a build material chamber in the housing to hold build material, the build material chamber having an opening for build material to be expelled from the build material chamber; and
   a build chamber positioned near the top of the housing, the build material chamber being positioned beneath the build chamber in the housing, the build chamber comprising a moveable support member, wherein a build material distributor is to supply successive layers of the build material onto the moveable support member from the build material chamber, the build module being removably insertable into a build receiver of an additive manufacturing system to allow the additive manufacturing system to solidify a portion of the successive layers received onto the moveable support member during a solidification process of the build material, and wherein the moveable support member separates the build material chamber from the build chamber to block build material from above the build material chamber from being received into the build material chamber during a solidification process of the build material.

2. The build module of claim 1, further comprising a second build material distributor to convey build material from the build material chamber to the build material distributor.

3. The build module of claim 2 further comprising a motor to drive the second build material distributor.

4. The build module of claim 1, further comprising:
   a first fastener member attached to the housing, wherein the first fastener member is to removably couple to a second fastener member attached to the build receiver of the additive manufacturing system, and wherein the build module is to be removably inserted into the build receiver generally laterally.

5. The build module of claim 4, wherein the first fastener member and/or the second fastener member comprise magnetic fasteners.

6. The build module of claim 4, wherein the first fastener member and/or the second fastener member comprise mechanical fasteners.

7. A build module comprising:
   a housing having a top and a bottom;
   a build material chamber in the housing to hold build material, the build material chamber having an opening for build material to be expelled from the build material chamber;
   a build chamber in the housing, the build chamber comprising a moveable support member to receive successive layers of the build material from the build material chamber as supplied by a build material distributor, and the build material chamber being positioned beneath the build chamber in the housing, wherein the moveable support member separates the build material chamber from the build chamber to block build material from above the build material chamber from being received into the build material chamber during a solidification process of the build material; and
   a computer-readable medium in the housing, the computer-readable medium comprising build module data representing a feature of the build module, the build module being removably insertable into a build volume of an additive manufacturing system to allow the additive manufacturing system to solidify a portion of the successive layers to be received onto the moveable support member during the solidification process of the build material.

8. The build module of claim 7, further comprising:
   a second build material distributor to convey build material from the build material chamber to the build material distributor.

9. The build module of claim 7, wherein the feature comprises a type of the build material held in the build material chamber.

10. The build module of claim 9, further comprising a sensor to detect the type of the build material held in the build material chamber.

11. The build module of claim 7, further comprising:
    a first fastener member attached to the housing, wherein the first fastener member is to removably couple to a second fastener member attached to the build receiver of the additive manufacturing system, and wherein the build module is to be removably inserted into the build receiver generally laterally.

12. A build module for an additive manufacturing system, the build module comprising:
    a housing having a top and a bottom;
    a build material chamber in the housing to hold build material, the build material chamber having an opening for build material to be expelled from the build material chamber to a build material distributor; and
    a build chamber positioned near the top of the housing, the build chamber comprising a moveable support member to receive build material from the build material chamber and wherein the build material distributor is to supply successive layers of the build material from the build material chamber to the build chamber, and the build material chamber being positioned beneath the build chamber in the housing, the build module being removably insertable into a build volume of the additive manufacturing system at a same time as another such build module to allow the additive manufacturing system to solidify a portion of the successive layers to be received onto the moveable support member during a solidification process of the build material, wherein the moveable support member separates the build material chamber from the build chamber to block build material from above the build material chamber from being received into the build material chamber during a solidification process of the build material.

13. The build module of claim 12, further comprising a second build material distributor to convey build material from the build material chamber to the build material distributor.

14. The build module of claim 12, wherein the build material chamber comprises a second moveable support member to hold the build material.

15. The build module of claim 12, further comprising:
a first fastener member attached to the housing, wherein the first fastener member is to removably couple to a second fastener member attached to the build receiver of the additive manufacturing system, and wherein the build module is to be removably inserted into the build receiver generally laterally.

* * * * *